(No Model.) 6 Sheets—Sheet 1.

B. F. MARTINDALE & F. D. MOORE.
PRESS.

No. 561,265. Patented June 2, 1896.

Witnesses,
W. C. Hutchins,
J. F. D. Casey

Inventors,
Benjamin F. Martindale,
Franklin D. Moore,
By Wm. J. Hutchins, atty.

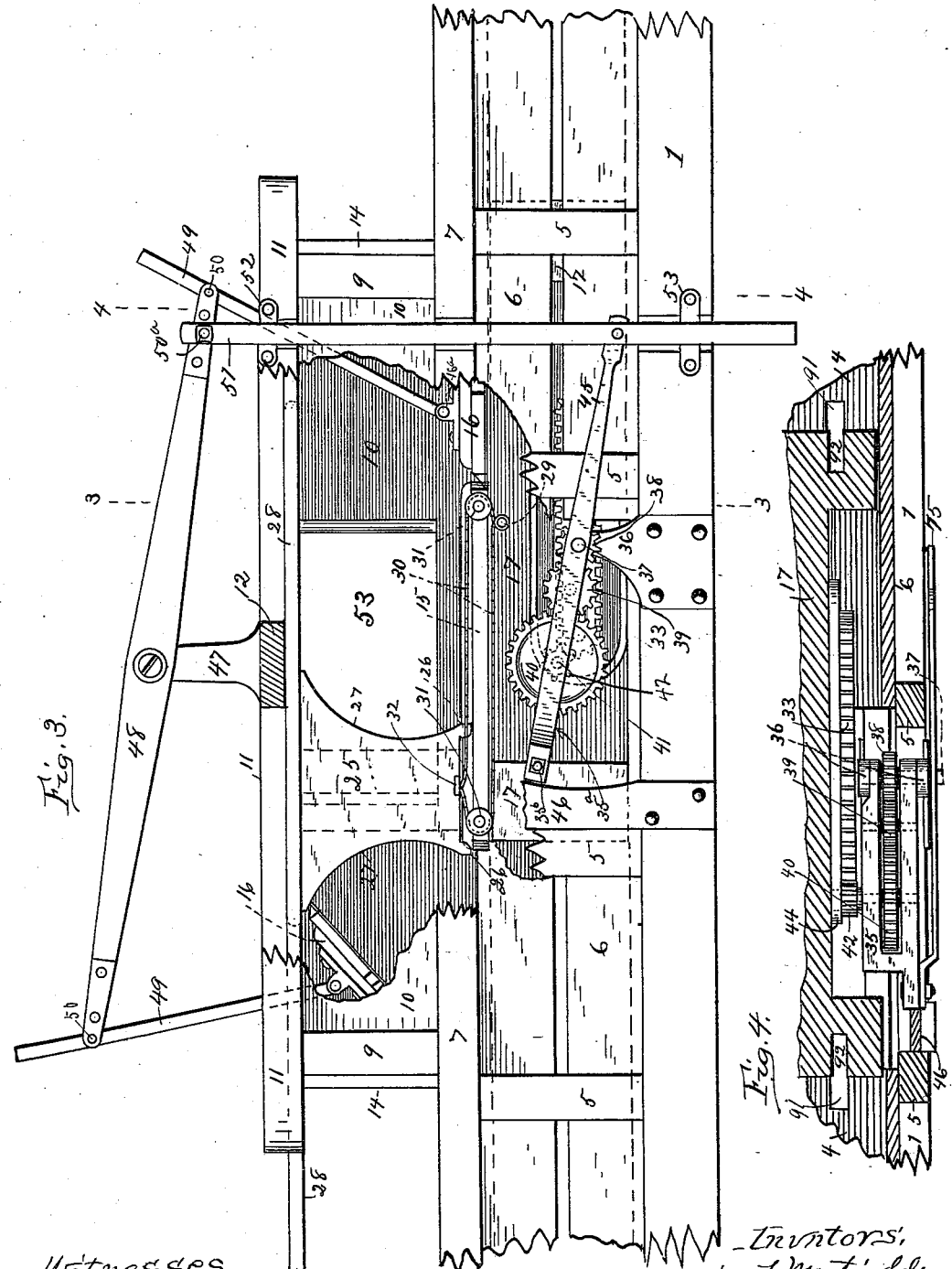

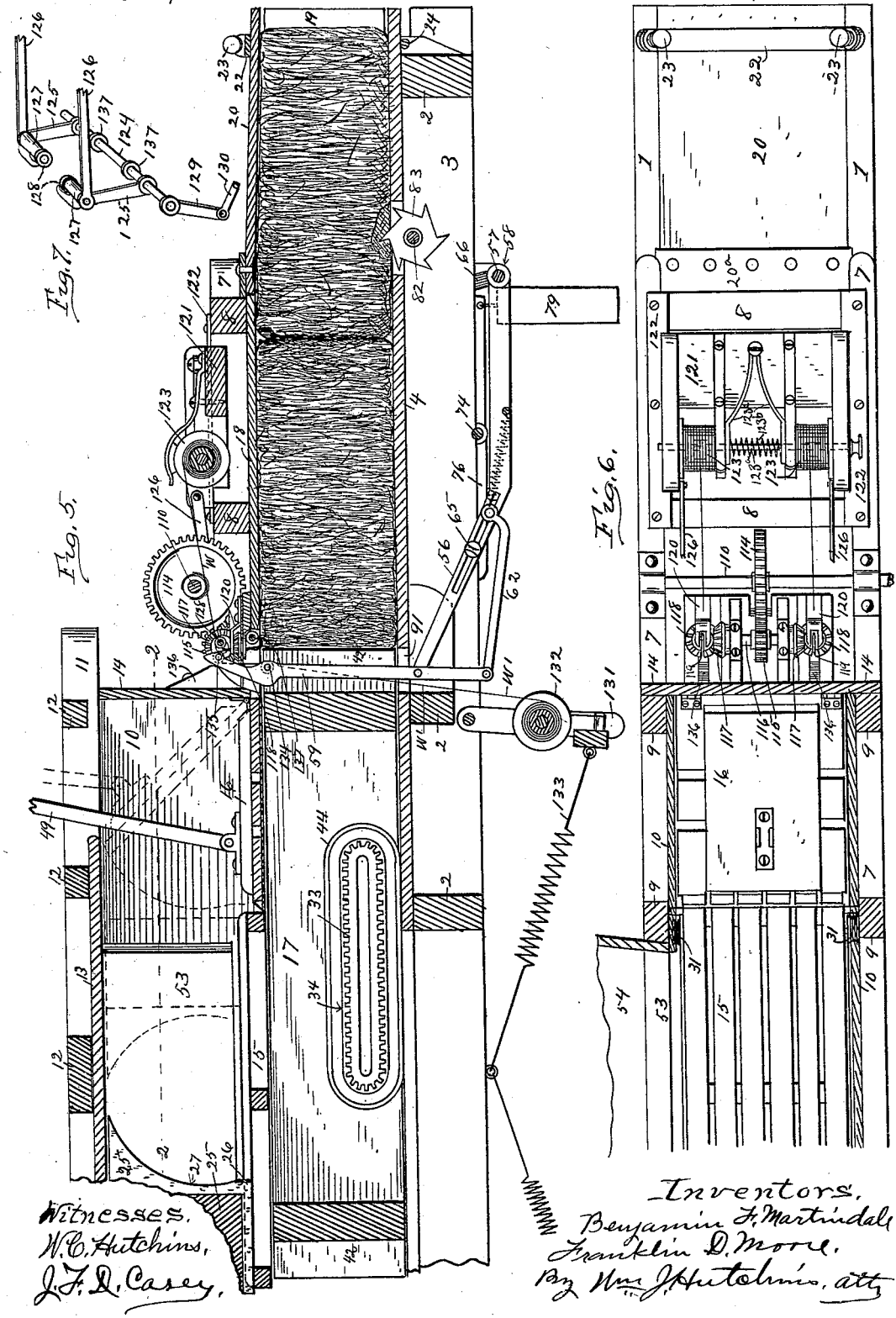

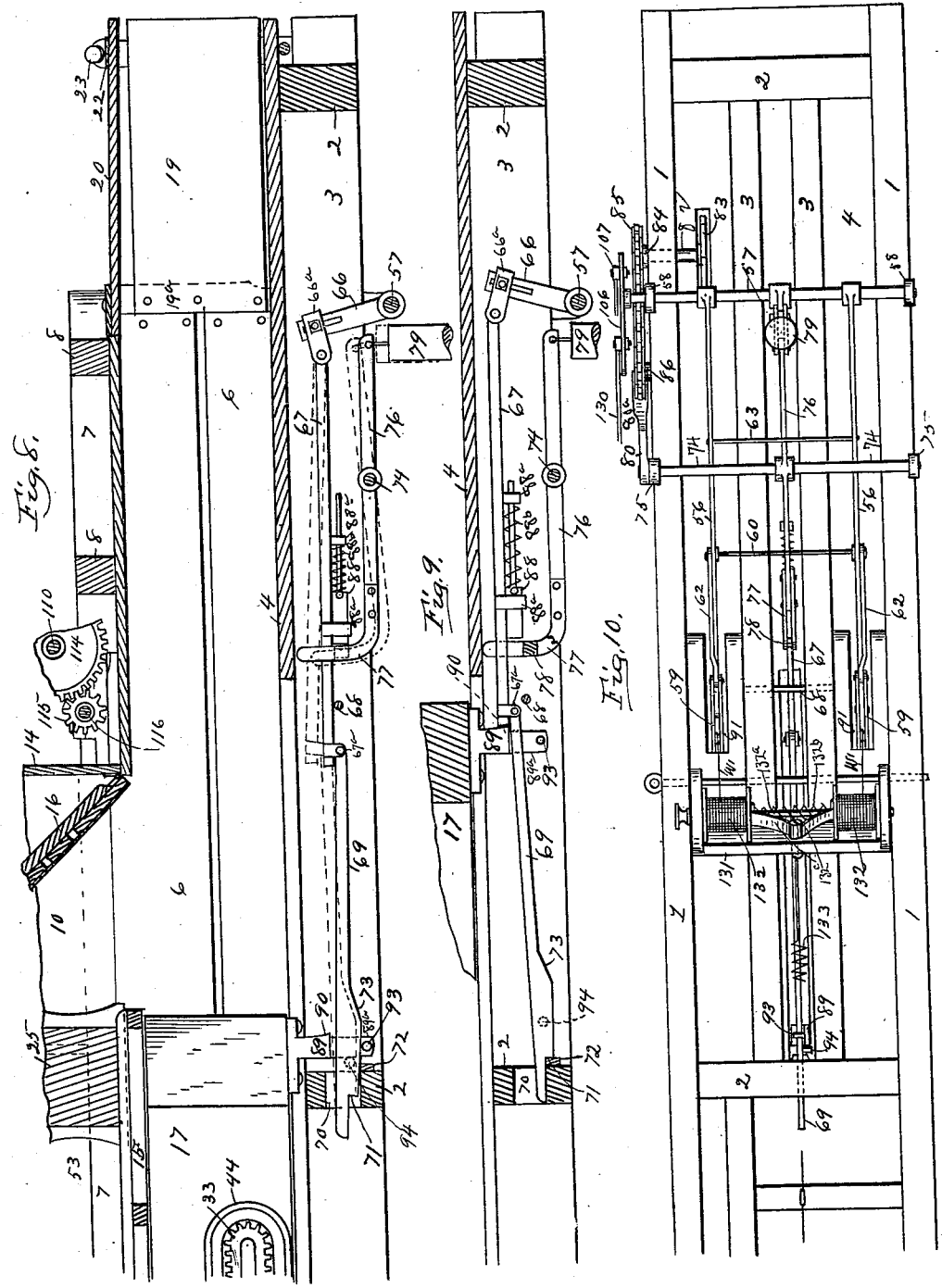

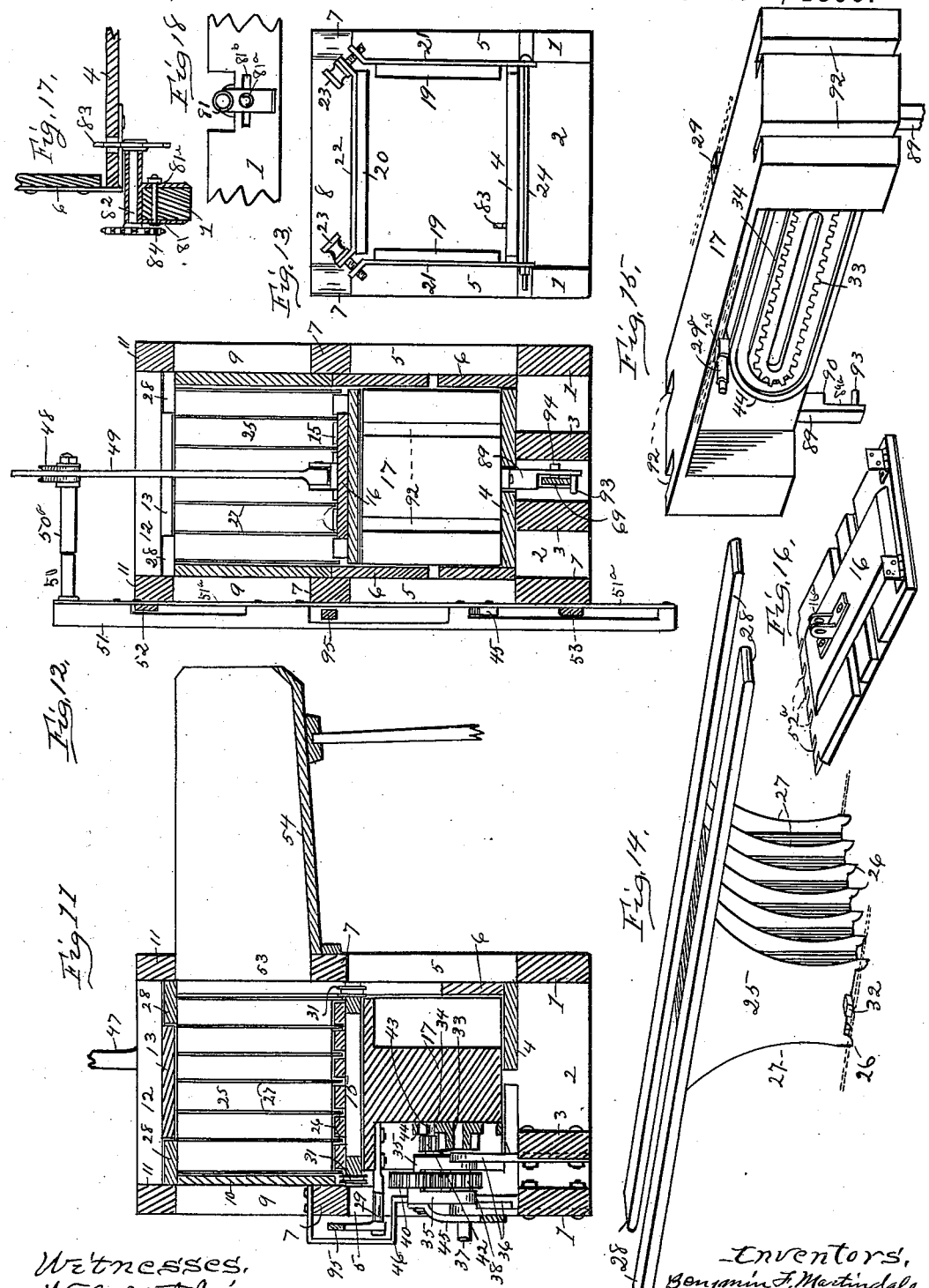

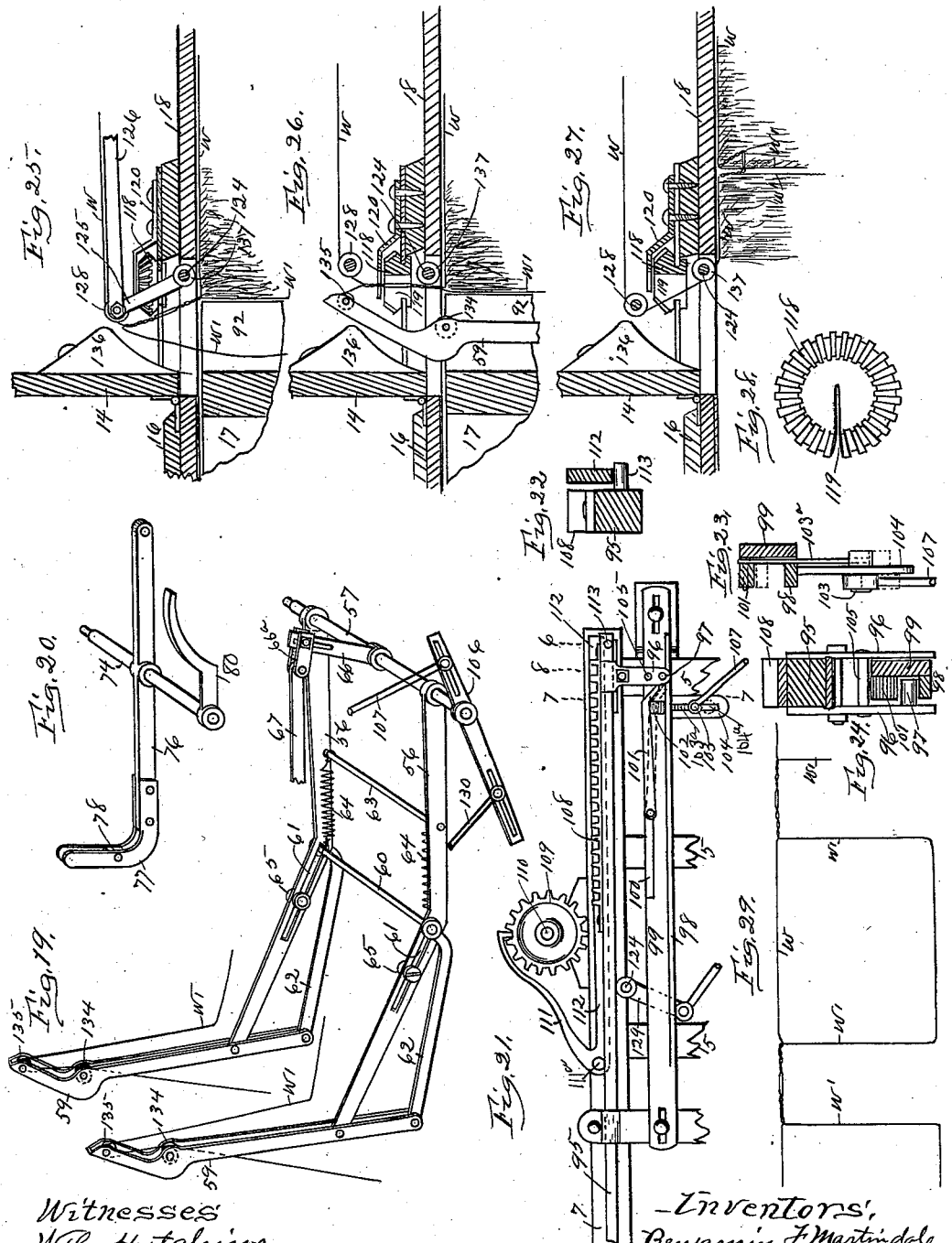

UNITED STATES PATENT OFFICE.

BENJAMIN FRANKLIN MARTINDALE AND FRANKLIN DAVIS MOORE, OF FORT SCOTT, KANSAS.

PRESS.

SPECIFICATION forming part of Letters Patent No. 561,265, dated June 2, 1896.

Application filed March 26, 1894. Serial No. 505,226. (No model.)

*To all whom it may concern:*

Be it known that we, BENJAMIN FRANKLIN MARTINDALE and FRANKLIN DAVIS MOORE, of Fort Scott, in the county of Bourbon, in the State of Kansas, have invented certain new and useful Improvements in Baling-Presses, of which the following is a full, clear, and exact description, reference being had to the accompanying drawings, which form a part of this specification.

Our invention relates to certain new and useful improvements in baling-presses, intended more especially for baling hay, but which may be used for baling straw or other like materials, of the class comprising a double baling-chamber and double-acting reciprocating traverser therein, and a feed-chamber connecting with the baling-chamber and a reciprocating feeder therein, and comprising also mechanism for binding the bale operatively connected with the baling mechanism; and our invention consists in certain features of novelty hereinafter described, and pointed out in the claims.

Figure 1:
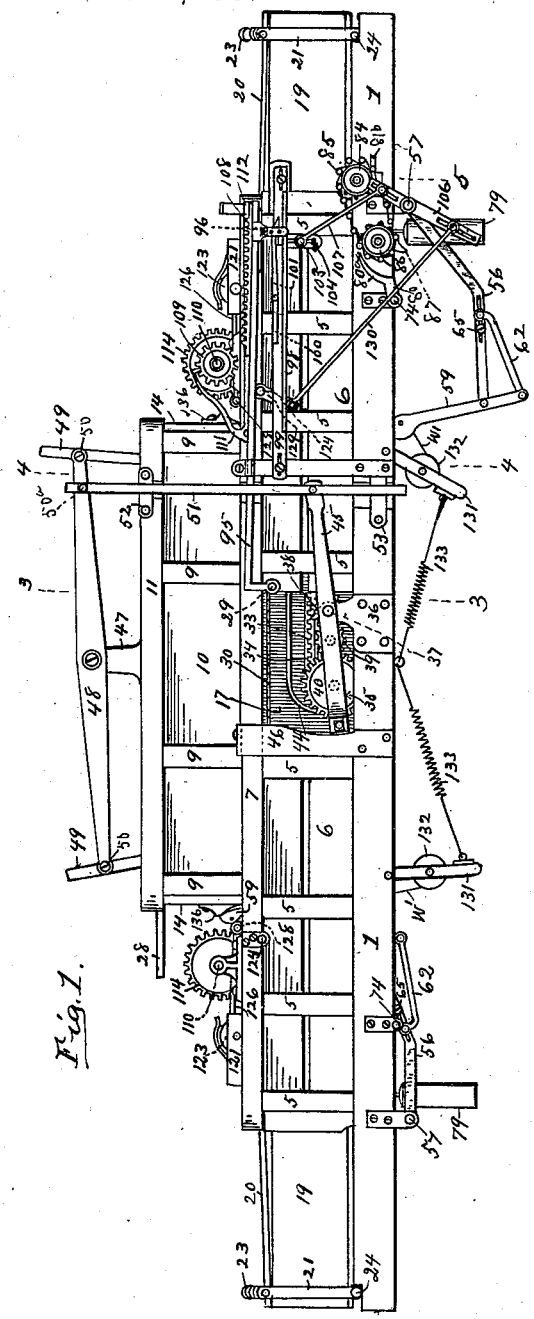
Figure 2:
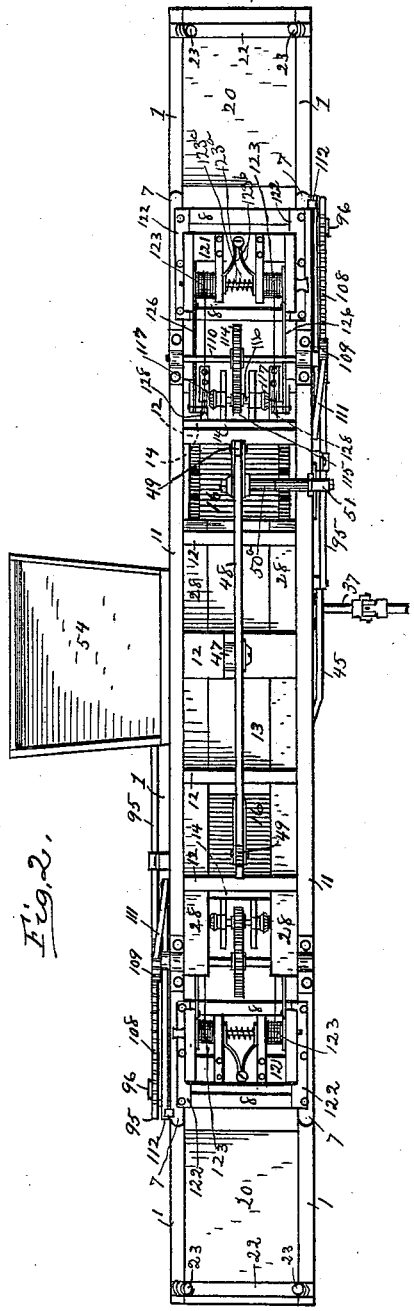

Figure 1 represents a side elevation of our improved baling-press. Fig. 2 represents a plan view of the same. Fig. 3 represents a side elevation of the press with the walls partly broken away. Fig. 4 represents a detail plan view of the rack-bar and rack-pinion by which the traverser is operated. Fig. 5 represents a sectional view showing the binding mechanism. Fig. 6 represents a top plan view of the same. Fig. 7 represents a detail perspective of the mechanism by which the binding-wires are guided to and from the twisters. Figs. 8 and 9 represent detail sectional views showing the mechanism by which the binding-needles are operated. Fig. 10 represents a bottom plan view showing the binding mechanism. Fig. 11 represents a cross-section on the line 3 3 of Figs. 1 and 3. Fig. 12 represents a cross-section on the line 4 4 of Figs. 1 and 3. Fig. 13 represents an end view of the expansible end portion of the press, showing the means for regulating the compression on the bale. Fig. 14 represents a detail perspective of the reciprocating feeder. Fig. 15 represents a detail perspective of the reciprocating traverser, showing the rack-bar and guides. Fig. 16 represents a detail perspective of the feed-door. Fig. 17 represents a cross-section on line 5 5 of Fig. 1, showing the adjustable bearing in which the shaft of the binder-trip sprocket-wheel is mounted. Fig. 18 represents an end view of said bearing. Fig. 19 represents a detail perspective of the binder-needles and their operating parts. Fig. 20 represents a detail perspective of the trip-arm by which the binding mechanism is set in operation. Fig. 21 represents a detail elevation of the rack-bar by which the binding mechanism is operated. Fig. 22 represents a cross-section of same on line 6 of Fig. 21. Fig. 23 represents a cross-section of same on line 7 of Fig. 21. Fig. 24 represents a cross-section of same on line 8 of Fig. 21. Fig. 25 represents a cross-section of the binding mechanism, showing position of the wire after bale is tied and needle withdrawn. Fig. 26 represents same cross-section with needle in binding position. Fig. 27 represents same cross-section after bale is tied and new bale commenced. Fig. 28 represents a detail view of the slotted wheel by which the wire is held and the twist made in tying the bale. Fig. 29 represents a view of the bale-wires as they appear about the bale.

Similar numerals and letters refer to similar parts throughout the several views.

1, 2, 3, 5, 7, 8, 9, 11, and 12 represent the frame of the baling-press.

4 represents the floor of the baling-chambers 6.

10 represents the feeding-chamber, the middle portion of which is covered by the crown-board 13, and is provided with the end walls 14.

15 represents a slotted division-board between the feeding-chamber and baling-chamber forming the bottom or floor of the feed-chamber, but leaving an open space between the ends thereof and the end walls of said feed-chamber, communicating with the baling-chamber.

16 represents the feed-doors, hinged to the end walls 14 of the feed-chamber and adapted to close the opening between said chamber and the baling-chamber between the ends of the floor 15 and said end walls 14.

17 represents the traverser, which is shown in detail in Fig. 15 and will be more particularly hereinafter described.

18 represents the top of the baling-chamber. 19 represents the sides, and 20 the top, of an extended portion of the baling-chamber, adapted to be expanded and contracted to regulate the density of the bale. Said sides and top are fixedly secured to the sides and top of the baling-chamber, as shown at 19ª and 20ª. The pressure of said sides and top upon the bale is regulated by contracting and expanding the same by the means shown more particularly in Fig. 13, in which 21 represents side bars connected with the sides 19, and 22 a top bar connected with the top 20, said top and side bars being connected at the upper corners by set-bolts 23, passing through angular extensions on the one and threaded into like angular extensions on the other, said side bars being connected at the bottom by a rod 24, passing through the same, headed at one end and provided with a nut at the other end exterior to the bars. By tightening said set-bolts and nut the space at the end within said extended portion is contracted and thereby the density of the bale is increased, and by loosening said set-bolts and nut said space is expanded and density of the bale is lessened.

25 represents the feeder, (shown in detail in Fig. 14,) consisting of a head-block adapted to reciprocate in the feed-chamber, having upon its operating-faces the curved blades or plates 27, terminating in the extended toes 26, adapted to enter and operate in the slots in the slotted division-board 15, and provided with the guide-bars 28, extending beyond the sides of the head-block to engage the sides of the feed-chamber, and operating in recesses between the crown-board 13 and the frames 11, as shown in Figs. 11 and 12.

29, Fig. 3, represents a stud or arm mounted on the traverser 17, with which is connected a suitable driving-belt 30. Preferably a chain belt is used, which passes around the pulleys 31, mounted on the sides of the press, and having its ends secured to the arm 32 on the feeder head-block, its relation and movement being such that as the traverser 17 moves in one direction the feeders will be moved in the opposite direction.

33 represents a double rack-bar connected with the traverser 17, Figs. 3 and 11.

36 represents an arm secured to the press-frame. Upon said arm is journaled the shaft 37, having fixedly mounted thereon the driving-pinion 38. Upon said shaft 37 is mounted at one end a block 35, to the opposite end of which, at 35ᵇ, is pivotally connected one end of the lever-arm 45, having its fulcrum on the shaft 37. In said block 35 is journaled the idler-gear 39, meshing with the driving-pinion 38 and also meshing with the drive-wheel 40, mounted also in said block 35 on the shaft 41. On said shaft 41, connected with said drive-wheel 40, is the rack-pinion 42, adapted to engage the rack-bar 33.

The shaft 41 extends beyond said rack-pinion and is provided with the wrist-roller 43, adapted to travel in the guideway formed by the flanges 34 and 44, whereby the rack-pinion is retained in mesh with the rack-bar in its travel around the same.

47 represents a standard supported upon the frame of the press, on which is mounted the walking-beam 48, at the opposite ends 50 of which are pivoted the arms 49, the lower ends of which arms are pivotally connected to the brackets 16ª, secured to the feed-doors 16.

51 represents the connecting-bar by which the walking-beam is operated. Said bar is pivotally connected with the walking-beam near one end through the arm 50, and near the other end is pivotally connected with the lever-arm 45, and is provided with the plate 51ª, engaging the keepers 52 and 53 on the frame, whereby said bar is retained in operative position.

46 represents a block secured to the frame having a dished face against which the end of the block 35 is adapted to bear to relieve the strain on the shaft 37.

52ª represents extensions on the feed-doors adapted to operate between the blades 27 on the feeder to clear the feed-chamber entirely at each action of the door and prevent entanglement of the material with the successive action of the feeder. Power is applied to the shaft 37 for the operation of the press in any usual or ordinary manner.

53 represents an opening in the side of the feed-chamber through which the material to be baled is passed from the table or platform 54 into the feed-chamber.

The operation of the baling part of the press is as follows: It being understood that the two ends of the press are in duplicate, let it be supposed that the parts are in the position shown in Fig. 3. The material is fed from the table or platform 54 through the opening 53 into the feed-chamber to the right and in front of the feeder 25. Now as the power is applied to the shaft 37 through the action of the gearing and the guidance of the wrist-roller 43 in the guideway formed by the flanges 34 and 44 the rack-pinion is carried around the end of the rack-bar and down to the under side thereof, by which action, through the action of the lever-arms 35ª 45 and the bar 51, connected to the walking-beam 48, the door 16 at the right-hand end of the feed-chamber is opened and the door 16 at the left-hand end is closed, and the power continuing to operate by the action of the rack-pinion upon the rack-bar the traverser 17 is moved to the left, and through the action of the belt 30 the feeder is moved to the right, carrying with it the material to and over the opening between the feed-chamber and the baling-chamber and against the feed-door at that end of the press, the curved operating-face of the feeder carrying the material against the door in such manner that as the door closes the swinging or outer edge of the door, following the curve, will fully encompass the material in its downward action. As the traverser reaches the end of its stroke to the left the feeder will have reached the end of its stroke to the right, and as the rack-pinion now travels by the guidance of the wrist-roller in the guideway, around the end of the rack-bar and to the top thereof, by the action of the lever through the connecting-bar 51 and walking-beam 48, the door 16 at the right-hand end is closed, carrying the material from the feed-chamber through the opening into the baling-chamber and closing said opening, the feeder remaining substantially at rest during the closing of the door. The door being hinged at one edge to the frame the operating-arm in closing the door is given a leverage in its action and the pressing force on the material greatly augmented thereby. Then as the traverser moves to the right, pressing the material carried into that end of the baling-chamber, the feeder will be moved to the left, carrying the material in the meantime fed into the feed-chamber to the left and in front of the feeder to and over the opening between the feed-chamber and baling-chamber at that end of the press, the door having been opened by the same action which closed the other door, and as the rack-pinion again passes the end of the rack-bar the door is closed and the charge of hay or other material delivered into the baling-chamber at that end to be pressed by the traverser on its return movement. Thus the action of the feeder and traverser is continuous, and as the traverser presses a charge at one end of the press a charge is delivered ready to be pressed at the other end of the press, resulting in a continuously-operating press.

57 represents a rock-shaft mounted in bearings 58, supported on the under part of the press-frame. To said rock-shaft are secured the arms 56, at or near the ends of which are pivotally attached the needles 59, said needles extending below said pivotal point of attachment to said arms.

60 represents a rod passing through said arms 56 and adapted to operate in the slot 61 therein, the movement of said rod in said slot being limited by the stop 65, adjustably fixed thereto.

62 represents connecting-bars carried at one end on said rod 60 and at the other end pivotally connected with the needles below their pivotal point of attachment to said arms 56. To said rod 60 are secured at one end the coil-springs 64, their other ends being secured to the rod 63, fixedly secured to the arms 56. To the rock-shaft 57, at or near the center thereof, is fixedly secured the arm 66, provided with the adjustable bracket 66$^a$, to which bracket is pivotally connected the longitudinally-extending arm 67, to which is coupled at 67$^a$ an extension 69, extending through an opening 70 in one of the timbers of the baling-press frame.

68 represents a rod mounted in frame by which said arm 67 is normally supported. The free end of the extension 69 is supported by the timber through which it passes, and is provided with the shoulder 71, adapted to engage in certain positions of the arm with the shoulder-block 72, secured to said timber, and is provided also near its free end with the beveled portion 73 and the pin 94.

74 represents a rock-shaft mounted in bearings 75, supported on the frame. 76 represents a rock-bar carried on said rock-shaft, having the upwardly-extending bifurcated portion 77, adapted to embrace the arm 67 and provided with the block 78, and at its other end having the weight 79 suspended therefrom.

88 represents a spring-bolt connected to the arm 67 by the keepers 88$^a$ and actuated by the coil-spring 88$^b$, and adapted to enter the bifurcated portion 77 of the rock-bar between the block 78 and the arm 67.

80 represents an arm secured to said rock-shaft 74 and terminating in an elongated curved finger 80$^a$, forming a trip-lever for operating said shaft.

81 represents a bearing recessed into the frame-piece 1 and adjustably secured to the frame by the bolt 81$^a$, passing through the slot 81$^b$ therein. In said bearing is journaled the shaft 82, upon which is mounted the spur-wheel 83, extending up through the floor 4 into the baling-chamber. Upon said shaft is also mounted the sprocket-wheel 84, carrying the sprocket-chain 85, which passes also around the sprocket-wheel 86, mounted on the frame, and is provided with the outwardly-extending finger 87, adapted to engage in its passage the terminal finger 80$^a$ of trip-lever 80.

89 represents a block secured to the under side of the traverser 17, adapted in the forward movement of the traverser to engage the end of the arm 67 to elevate the needles, the engaging face of said block at 90 and the end of said arm being slightly beveled to make more secure the engagement. The block 89 has also a downward extension 89$^a$, provided with the pin 93, adapted to engage the beveled portion 73 of the extension 69.

91 represents openings in the floor 4 for the passage of the needles, and 92 represents recesses in the traverser for the needles to pass up through without becoming entangled with the material in front thereof.

95 represents a bar pivotally connected to the wrist-pin 29$^a$ on the arm 29 of the traverser and is provided at its outer portion with the rack-bar 108. Said bar is supported at its outer end by the arm 96, having the pins 97 and 105.

99 represents a plate adjustably secured longitudinally of the press upon the rail 98, along the lower edge of which the pin 97 is adapted to slide as the bar 95 moves backward and forward.

100 represents a short rail along the upper edge of the plate 99.

101 represents a switch-rail pivoted to plate 99 at the end of rail 100 and forming therewith a continuous rail. Said switch-rail terminates in the arm 102, extending downwardly at an angle to close proximity with rail 98. Said switch-rail 101 is adapted to rest upon the head of the switch-bar 103$^a$, near the lower end of which is provided the stud 103, working in the slot 104$^a$ in the arm 104, depending from the plate 99. To said stud 103 is connected one end of the connecting-rod 107, the other end of which is slidingly connected with one arm of the rocking lever 106, mounted on the rock-shaft 57, the relation being such that when the shaft is working to elevate the needles by the action of said lever-arm through the connecting-rod the switch-bar 103$^a$ will be depressed, permitting the inclined portion 102 of the switch-rail to rest upon the rail 98, and the pin 97 in the arm 96 being by the action of the traverser which actuated the rock-shaft carried forward of the switch on the rail 98. As the reverse movement of the traverser carries back the bar 95 the pin 97 is switched from the rail 98 to the switch-rail 101 and rail 100, elevating said bar 95 at the end supported thereby for the purpose now to be noticed.

108 represents a rack-bar secured to the bar 95 and adapted when said bar is switched from the rail 98 to the switch-rail 101, as above described, to be engaged by the rack-gear 109, mounted upon the shaft 110, having its bearings on the frame. Said rack-gear when not in action is locked by the pawl 111 engaging therewith. Said pawl is pivoted on the frame at 111$^a$ and is provided with the longitudinally-extending arm 112, engaging near its end the pin 113 near the end of the bar 95, whereby when said bar 95 is elevated said pawl is thrown out of engagement and the rack-gear released for the action of the rack-bar thereon, the relation between the rack-bar 108 and the rack-gear being such that said rack-gear will be given one complete revolution by the passage of the rack-bar in engagement therewith.

On the shaft 110 of the rack-bar 109 is mounted the gear-wheel 114, which meshes with the pinion 115, mounted on the shaft 116, having its bearings upon the frame. Upon said shaft 116 are mounted the bevel gear-wheels 118, mounted upon vertical shafts journaled in suitable bearings on the frame. Said gear-wheels 118 are provided with the slots 119, Fig. 28, extending from the periphery to a little beyond the center of the wheel, the purpose of which will be hereinafter pointed out. Said wheels and their shafts are secured from vertical movement by the caps or forked keepers 120, secured as shown in Figs. 26 and 27.

121 represents a spool-carriage mounted in ways on the guide-frame 122 and adapted to slide in said ways. 123 represents spools mounted on the shaft 123$^a$ on said carriage, adapted to carry the upper baling-wires. A frictional tension is given to the wires as they are paid off of said spools by the arms 123$^b$, bearing against the ends of the sleeves upon which said spools are mounted on the shafts, and the interposed coil-spring 123$^c$ on said shaft between said arms. 124 represents a rocking shaft suitably journaled on the frame. On said shaft is mounted the rocking arms 125, which at or near their upper ends are connected with the spool-carriage by the connecting-rod 126. On said rocking arms 125 are carried the short arms 127, (shown in detail in Fig. 7,) on which are mounted the grooved pulleys 128, carrying the upper baling-wires $w$ as they are paid off from the spools, being so located that as the arms 125 are rocked they will pass immediately over the slots 119 in the gear 118, guiding the wires $w$ into said slots, said wires passing under the ground-pulleys 137 and along the top of the bale. Said shaft 124 is provided at its end with the crank-arms 129, connected by the connecting-rod 130 with a slotted portion of the arm of the rocking lever mounted on the shaft 57, the relation being such that as the shaft 57 is rocked to elevate the needles said lever-arm is rocked, thereby rocking the arms 125 on the shaft 124, carrying the spool-carriage on its ways away from the gear 118 and at the same time carrying the wire-bearing pulleys 128 over the slots 119 in said gear-wheels and guiding the wires $w$ into said slots ready for twisting, as presently to be described, the movement of said spool-carriage being provided to correspond with the movement of the guide-pulleys to preserve the tension of the wires $w$.

131 represents a spool-frame pivotally supported on the frame of the press. 132 represents the spools carrying the lower baling-wire $w'$, mounted on the shaft 132$^a$, a frictional tension being given to said wires by the flat spring 132$^c$, bearing against the sleeves upon which said spools are mounted on the shaft, aided and strengthened by the coil-spring 132$^b$ on said shaft.

155 represents a coil-spring connecting the lower part of the spool-frame with a stationary portion of the press to yieldingly retain the same out of the path of the needles. The wire $w$ is carried from the spool under the grooved pulley 134 in the needles and over the grooved pulleys 135 near the points of the needles, whereby, the needles being arched as shown in Figs. 19 and 26, the wire is carried as the needles are elevated into the slot 119 in the gears 118, the blocks 136 on the frame being provided to press the points of the needles back and direct them over the slots.

The operation of the baling mechanism is as follows: The pressure of each succeeding charge of hay carries forward the hay already in the baling-chamber over the spur-wheel 83, thereby revolving the shaft 82 and the sprocket-wheel 84 thereon, carrying with it the sprocket-chain 85, which passes about the sprocket-wheel 86. When in the passage of the sprocket-chain about the sprocket-wheels the finger 87 on said chain engages the extended arm 80ª of the trip-lever 80, the rock-shaft 74 is thereby actuated, the weight 79 on the arm of the rocking bar 76 is raised, and the bifurcated portion 77 on the other arm of said rocking bar is depressed to such extent as to release the bolt 88 from its engagement from the stop-block 78 in said bifurcated portion and permit it to pass in over said block and under the longitudinally-extending arm 67. With the further travel of the sprocket-chain the finger 87 is released from the trip-lever, and the weight 79 descending, the blocks 78 and 88 and the arm 67 are raised until the end of said arm is brought into the line of travel of the shoulder 90 on the block 89 on the traverser, said arm 67, when normally at rest upon the pin 68, being below said line of the travel. Now as the traverser advances to press the next succeeding charge the shoulder 90 on the block 89 engages the end of the arm 67 and through the arm 66 rocks the rock-shaft 57, elevating the needles into the position shown in Figs. 5 and 26, the block 136 pressing the point of the needles forward as they reach their highest elevation and carrying the wires $w'$ into the slots 119 in the twisters 118. The needles being pivoted on the arms 56 and retained by the spring-actuated connecting-bars 62, pivotally connected therewith below the pivoted point of arms 56, this action is permitted. By the same action of the rock-shaft 57 which elevates the needles the rocking lever 106 on said shaft is actuated, and through the connecting-rod 130, connected therewith and with the crank-arm 129 on the rock-shaft 124, the rocking arms 125 on said shaft are rocked, the spool-frame 121 is carried forward on its ways, and the wires $w$, passing over the grooved guide-pulleys 128 on said arms 125, are brought within the slots 119 in the twisters 118. At this point, as the traverser reaches the limit of its stroke, the shoulder 71 on the extension 69 falls into engagement with the shoulder-block 72, thus locking the needles in their elevated position and the spool-carriage in its forward position, with the wires $w$ and $w'$ in the slot of the twister. By the same action of the rock-shaft 57 by which the needles were elevated and the spool-carriage shifted, and by the action of said rocking lever 106 on said shaft through the connecting-rod 107, the switch-bar 103ª is depressed and the inclined end portion 102 of the switch-rail 101 is let down upon the rail 98, the pin 97 in the arm 96, supporting the rack-bar arm 95, connected at 29 to the traverser, being forward of said inclined portion of the switch-rail. Now as the traverser, having reached the limit of its stroke, starts on its reverse movement said pin 97 rises upon said incline of the switch-rail, raising the rack-bar arm 95, and thereby, by the pin in said rack-bar arm engaging the pawl-arm 112, the pawl is released from its engagement with the rack-gear 109. Then as the traverser continues its reverse movement the rack 108 engages said rack-gear, and through the intermediate gearing the twisters 118 are operated and the wires engaged in the slots 119 thereof are twisted together and the tie made. When the pin 97 reaches the end of the rail 100, it falls again upon rail 98, thus releasing the engagement of the rack with the rack-gear and permitting the pawl to again engage therewith and the twisters close their action, the relation of the gearing being such that the twisters stop with the slots in the same longitudinal relation as when they started and in position for release of the wires therefrom. As the traverser now continues its reverse movements the pin 93 in the extension 89ª of the block 89 engages the beveled portion 73 of the extension-arm 69, lifting said arm and disengaging the shoulder 71 from the shoulder-block 72, and as the traverser still further continues its movement the said extended portion 89ª comes in contact with the pin 94 in said extended arm 69, and through the action of the rock-shaft 57 and its connected parts the needles are depressed and the spool-carriage and guide-pulleys 128 restored to their initial position and the twisted wires removed from the twisters. As the needles descend the wires $w'$ are paid out, and it will be observed that as the bale is made up and tied said wires bind both ends and the bottom of the bale, the wires $w$ binding the top. It will also be borne in mind that each end of the press is provided with the like tying mechanism, operated in the same way as above described, so that a bale is pressed and tied in each end of the press by the reciprocating action of the traverser.

Having thus fully described the construction and operation of our improvements, what we claim as our invention, and desire to secure by Letters Patent, is—

1. In a baling-press the combination with a baling-chamber and a reciprocating traverser operating therein of a feed-chamber communicating with said baling-chamber, a reciprocating feeder having a curved operating-face in said feed-chamber, and a feed-door hinged to the press-frame adapted to act in unison with said feeder, substantially as set forth.

2. In a baling-press the combination with a baling-chamber a delivery portion having an expansible end connected with said baling-chamber at each end thereof, and a reciprocating traverser in said baling-chamber, of a feed-chamber communicating with said baling-chamber at or near the entrance to said delivery portions, a reciprocating feeder having opposite curved operating-faces in said feed-chamber, and feed-doors hinged to the press-frame adapted to act in unison with said feeder, substantially as set forth.

3. In a baling-press the combination with a baling-chamber and a reciprocating traverser operating therein, of a feed-chamber communicating with said baling-chamber, a feeder in said feed-chamber, a hinged door adapted to act in unison with said feeder, and a belt connecting the feeder and traverser and operated by the traverser for reciprocating the feeder, substantially as set forth.

4. In a baling-press the combination with a baling-chamber and a reciprocating traverser operating therein, of a feed-chamber communicating with the baling-chamber in the path of the traverser, a reciprocating feeder in the feed-chamber, feed-door for closing said openings between the feed-chamber and the baling-chamber, means for closing and opening said doors, means for reciprocating the traverser, arms on the traverser, arms on the feeder, suitable pulleys mounted on the frame of the press and a belt connected to said arms on the feeder and traverser and passing over said pulleys to give a reciprocating movement to the feeder in direction reverse to the movement of the traverser, substantially as set forth.

5. In a baling-press the combination with a suitable baling-chamber and a reciprocating traverser operating therein, of a feed-chamber communicating with said baling-chamber, a reciprocating feeder in said feed-chamber, feed-doors hinged to the press-frame, means for opening and closing said doors and a belt passing over pulleys mounted on a stationary portion of the press connecting said feeder with the traverser, substantially as set forth.

6. In a baling-press the combination with a baling-chamber having a compression-chamber at each end thereof, a reciprocating traverser acting alternately in said compression-chambers and a feed-chamber communicating with said baling-chamber of a feeder in said feed-chamber, said feeder consisting of a head-block, curved blades arranged vertically on the faces of said head-block, toes on said blades extending beyond the head-block and adapted to move in the slots in the floor of the feed-chamber, guide-bars extending longitudinally of the press to which said head-block is attached and adapted to move in ways in the press-frame, and means for reciprocating said feeder, substantially as set forth.

7. In a baling-press, a feeder consisting of a head-block, curved blades arranged vertically on the face of said head-block, and guide-bars to which said head-block is attached adapted to move in ways in the press-frame, substantially as set forth.

8. In a baling-press the combination with a feed-chamber openings communicating with the baling-chamber of the press, of a reciprocating feeder in said feed-chamber, said feeder consisting of a head-block, vertically-arranged curved blades on the faces of said head-block, and guide-bars to which said head-block is attached, adapted to move in ways in the press-frame, feed-doors to close said openings in the feed-chamber, extensions on the feed-doors adapted to operate in the space between the blades on the head-block, means for reciprocating the feeder and means for opening and closing said doors, substantially as set forth.

9. In a baling-press the combination with a baling-chamber having a compression-chamber at each end thereof, a reciprocating traverser acting alternately in said compression-chambers, and means for reciprocating said traverser, of a feed-chamber, a reciprocating feeder in said feed-chamber, means for reciprocating said feeder, openings in said feed-chamber communicating with the baling-chamber in the path of the traverser feed-doors for closing said openings, a walking-beam mounted on the press-frame, arms connecting the ends of said walking-beam with the feed-doors, a lever mounted on the press-frame, having one arm connected to said walking-beam and the other arm to the traverser so that as the traverser is reciprocated said feed-doors will be alternately opened and closed, substantially as set forth.

10. In a baling-press the combination with a baling-chamber having a compression-chamber at each end thereof, a reciprocating traverser acting alternately in said compression-chambers and means for reciprocating the traverser, of a feed-chamber, openings in said feed-chamber communicating with the baling-chamber in the path of the traverser, a feeder in the feed-chamber, a belt passing over pulleys on the press-frame connecting the feeder to the traverser for reciprocating the feeder reversely to the reciprocation of the traverser, feed-doors for closing said openings, a walking-beam mounted upon the press-frame, arms connecting the ends of said walking-beam with said feed-doors, a lever fulcrumed on the frame having one arm connected with the traverser for opening and closing said feed-doors, substantially as set forth.

11. In a baling-press the combination with a baling-chamber having a compression-chamber at each end thereof, a reciprocating traverser acting alternately in said compression-chambers and means for feeding the material to be baled into the baling-chamber in the path of the traverser, of a continuous double rack-bar mounted on the traverser, a guideway surrounding said rack-bar, an oscillating, pivoted bearing-block mounted upon a shaft having its bearings supported on the press-frame, a drive-pinion mounted on said shaft, driving-gear mounted on said bearing-block, a rack-pinion connected with said driving-gear adapted to rise and fall with said bearing-block as it follows said rack-bar, a wrist-roller suitably mounted on said head-block, and traveling in said guideway on the traverser, and means for imparting motion to said drive-pinion, substantially as set forth.

12. In a baling-press the combination with a baling-chamber, a reciprocating traverser operating therein, a continuous double rack-bar and a guideway concentric with said rack-bar, of a drive-pinion mounted on a shaft having fixed bearings on the press-frame, a rack-pinion adapted to follow said rack-bar, a pivoted bearing-block in which said rack-pinion is mounted adapted to rise and fall as said rack-pinion travels around said rack-bar, suitable gearing connecting the drive-pinion with the rack-pinion, and a wrist-roller traveling in said guideway to retain said rack-pinion in mesh with said rack-bar, substantially as set forth.

13. In a baling-press the combination with a baling-chamber having a compression-chamber at each end thereof, a reciprocating traverser acting alternately in said compression-chambers and means for operating said traverser, of a feed-chamber having a slotted floor communicating at its ends with the baling-chamber in the path of the traverser, feed-doors for closing said communication, means for opening and closing said feed-doors, a reciprocating feeder in said feed-chamber, said feeder consisting of a head-block, curved blades arranged vertically on the faces of said head-block, toes on said blades extending beyond the head-block and adapted to move in the slots in the floor of the feed-chamber, guide-bars extending longitudinally of the press to which said head-block is attached and adapted to move in ways in the press-frame, and means for reciprocating the feeder, substantially as set forth.

14. The combination with a reciprocating traverser and a block thereon of a trip-lever mounted on a rocking shaft, journaled on the press-frame, a rocking bar mounted on said shaft, a weight at one end of said rocking bar, a bifurcated upwardly-extending portion at the other end of said bar, the needles mounted on a rocking shaft, journaled on the press-frame an arm connected with said needle-shaft, embraced by the bifurcation on said rocking bar and with which the block on the traverser is adapted to come in contact, and means for rocking said bar, to elevate said arm into the path of said block, substantially as set forth.

15. The combination with a reciprocating traverser and a block thereon, of a trip-lever, a rocking shaft on which said trip-lever is mounted, a rocking bar mounted on said shaft, a bifurcated upwardly-extending portion on the other end of said rocking bar, a block between the branches of said bifurcated portion, the needles, a rock-shaft on which said needles are carried, a crank-arm on said shaft, a longitudinally-extending arm pivotally and adjustably connected with said crank-arm embraced by the bifurcation of said rocking bar and adapted to be engaged at certain times by said block on the traverser, a spring-actuated bolt on said arm bearing normally against said block in said bifurcated portion and adapted when released to enter between the branches thereof between said block and said arm a support for said arm when in normal position out of the path of said block on the traverser and an automatic trip actuated by the material passing through the press for tripping said trip-lever, to cause said arm to be elevated into the portion of the block on the traverser, substantially as set forth.

16. The combination with a reciprocating traverser, a block on said traverser and means for reciprocating the traverser, of the needles, a rock-shaft on which said needles are mounted; a crank-arm on said shaft, a longitudinally-extending arm having adjustably-pivoted connection with said crank-arm, a pin the frame supporting the other end of said arm, an extension coupled onto said arm near the end thereof, and working in a cross-piece of the press-frame, a shoulder on said extension near the end thereof adapted to engage a shoulder-block on said cross-piece when the needles are elevated and lock the needles in such elevated position, a beveled portion on said extension a pin in said block on the traverser adapted to engage said beveled portion and release said shoulder, and a pin in said extension adapted to be engaged by said block to retract said needle-arm and depress the needles, substantially as set forth.

17. The combination with a rock-shaft suitably journaled on the press-frame and a crank-arm mounted on said shaft, of rocking arms mounted on said shaft, needles pivoted on said rocking arms at a distance from their ends, connecting-bars pivoted to the needles at or near their ends, a rod adapted to slide on said rocking arms to which said connecting-bars are connected, springs connected to said rod and to said arms controlling the movements of said rod, and means for rocking said rock-shaft to elevate and depress the needles, substantially as set forth.

18. The combination with a rock-shaft suitably journaled on the press-frame, rocking arms mounted on said shaft, needles pivoted at a distance from their ends upon said arms, and connecting-bars pivoted near the ends of the needles and having flexible connection with said arms, of a crank-arm mounted on said rock-shaft, a longitudinally-extending arm having adjustable pivotal connection with said crank-arm, a reciprocating traverser, a block on said traverser adapted to engage at certain times with said longitudinally-extending arm, a support for said arm out of the path of said block a rocking lever for bringing said arm into the path of said block as the traverser advances and an automatic trip controlling the action of said rocking lever, substantially as set forth.

19. The combination with a rock-shaft suitably journaled on the press-frame, rocking arms mounted on said shaft, needles pivoted at a distance from their ends upon said arms, and connecting-bars pivoted near the ends of the needles, and having flexible connection with said arms, of a crank-arm mounted on said rock-shaft, a longitudinally-extending arm having adjustable pivoted connection with said crank-arm, a reciprocating traverser, a block on said traverser adapted to engage at certain times with the longitudinally-extending arm, a support for said arm out of the path of the block, a rocking lever for carrying said arm into the path of said block as the traverser advances, an extension coupled on said arm and having a suitable support, a shoulder on said extension adapted to engage its support when the needles are elevated to lock the needles in their elevated position, substantially as set forth.

20. The combination with a rock-shaft suitably journaled on the press-frame, rocking arms mounted on said shaft, needles pivoted at a distance from their ends upon said arms, and connecting-bars pivoted near the ends of the needles, and having flexible connection with said arms, of a crank-arm mounted on said shaft, a longitudinally-extending arm having adjustable pivotal connection with said crank-arm, a reciprocating traverser, a block on said traverser adapted to engage at certain times with said longitudinally-extending arm, a support for said arm out of the path of said block, a rocking lever for carrying said arm into the path of said block as the traverser advances an extension coupled on said arm and having a suitable support on the frame, a shoulder on said extension adapted to engage said support when the needles are elevated to lock the needles in their elevated position, a beveled portion on said extension, a pin on said block adapted to engage said beveled portion as the traverser recedes to release said shoulder from its engagement, a pin in said extension with which said block is adapted to engage, to retract said arm and depress the needles, substantially as set forth.

21. The combination with the needles, a rocking shaft on which said needles are carried, a longitudinally-extending arm connected with said rocking shaft, a support for said arm, a spring-bolt on said arm and means in connection with said arm for elevating and depressing the needles, of a rocking lever fulcrumed on a shaft journaled on the frame of the press, a weight on one arm of said rocking lever, a bifurcated upwardly-extending portion on the other arm thereof, a block on said upwardly-extending portion adapted to engage said spring-bolt a trip-lever on the shaft of said rocking lever, and means actuated by the material passing through the baling-chamber for tripping said trip-lever and depressing said upwardly-extending portion of said rocking lever, to release said spring-bolt, substantially as set forth.

22. In a baling-press a shaft having the needles mounted thereon, an arm connected with the needle-shaft for operating the needles, a bifurcated rocking lever provided with a block at the point of bifurcation adapted to engage said arm for controlling the operation of the needles, and a trip controlling the action of said lever, substantially as set forth.

23. In a baling-press a shaft having the needles mounted thereon an arm connected with the needle-shaft for operating the needles, a weighted, bifurcated rocking lever adapted to engage said arm for controlling the operation of the needles, and an automatic trip controlling the action of said lever, substantially as set forth.

24. In a baling-press a shaft having the needles mounted thereon an arm connected with the needle-shaft for operating the needles, a weighted, bifurcated rocking lever adapted to engage said arm for controlling the operation of the needles and a trip actuated by the material passing through the press controlling the action of said lever, substantially as set forth.

25. The combination with a baling-chamber, the needles, a rocking shaft on which said needles are carried, a longitudinally-extending arm connected with said rocking shaft, a support for said arm, a spring-bolt on said arm, and means for acting upon said arm, for elevating and depressing the needles, of a rocking lever, a rocking shaft on which said lever is mounted, a weight on one arm of said lever, a bifurcated upwardly-extending portion on the other arm of said lever, a block on said upwardly-extending portion, a trip-lever on the shaft of said rocking lever, a sprocket-chain passing over sprocket-wheels mounted on the press-frame, an extended finger on said sprocket-chain adapted to engage and trip said trip-lever, a shaft on which one of said wheels is mounted, and a spur-wheel mounted on said shaft and extending into the baling-chamber in the path of the material passing through the same, substantially as set forth.

26. The combination with the baling-chamber of the sprocket-chain, the sprocket-wheels mounted on the press-frame on which said chain is carried, the extended finger upon said chain, the shaft upon which one of the said wheels is mounted and the spur-wheel mounted on said shaft extending into the baling-chamber in the path of the material passing therethrough substantially as set forth.

27. The combination with the baling-chamber, the needles and an arm connected to the needle-shaft for elevating and depressing the needles, of a rocking lever controlling the operation of the needles, a trip-lever on the shaft of said rocking lever, a sprocket-chain passing over sprocket-wheels mounted on the press-frame, an extended finger on said sprocket-chain adapted to engage with and trip said trip-lever, and a spur-wheel connected with one of said wheels and extending into the baling-chamber in the path of the material passing therethrough, substantially as set forth.

28. The combination with the baling-chamber, and the spur-wheel extending into the baling-chamber in the path of the material passing therethrough, of the shaft on which said spur-wheel is mounted, an adjustable bearing for said shaft, a sprocket-wheel on said shaft, a sprocket-wheel mounted on the press-frame, a sprocket-chain passing over said wheels and an extended finger on said sprocket-chain, substantially as set forth.

29. The combination with the baling-chamber, the needles and an arm connected with the needle-shaft for elevating and depressing the needles, of a rocking lever controlling the operation of the needles, a trip-lever on the shaft of said rocking lever, a spur-wheel extending into the baling-chamber in the path of the material passing therethrough, a shaft on which said spur-wheel is mounted, an adjustable bearing for said shaft, a sprocket-wheel on said shaft, a sprocket-wheel mounted on the press-frame, a sprocket-chain passing over said wheels, and an extended finger on said sprocket-chain adapted to engage with and trip said trip-lever, substantially as set forth.

30. The combination with a suitable baling-chamber, and a reciprocating traverser operating therein, of a longitudinally-extending arm connected with the traverser, a rack-bar on said arm, a plate adjustably secured, longitudinally of the press-frame, a track-rail on said plate, a short rail on said plate above said track-rail, a switch-rail having an inclined outer end portion pivoted to said plate at the end of said short rail, an arm on said rack-bar arm provided with a pin supporting said rack-bar arm upon said track-rail, and means for switching said switch-rail to cause said supporting-arm to travel up on said switch-rail and raise said rack-bar, substantially as set forth.

31. The combination with a reciprocating traverser, a block on the traverser, an adjustable plate mounted longitudinally upon the press-frame, a track-rail on said plate, a short rail on said plate above said track-rail, a switch-rail pivoted on said plate at the end of said short rail and having an inclined outer end, a switch-bar supporting said switch-rail, a connecting-rod connected to said switch-bar, a rocking arm to which said connecting-rod is connected at its outer end, a crank-arm on the shaft of said rocking arm and a longitudinally-extending arm connected with said crank-arm and adapted to be engaged by said block on the traverser to operate said switch-bar and close the switch and lock the same, of a longitudinally-extending arm connected with the traverser, a rack-bar on said arm, an arm connected with said rack-bar arm provided with a pin for supporting said rack-bar arm upon said track-rail and adapted when said switch is closed to travel up on said switch-rail and raise said rack-bar, and means in connection with said block on the traverser for releasing the switch-bar and opening the switch substantially as set forth.

32. In a baling-press the combination with a rack-pinion, a rack-bar adapted to engage at certain times therewith and a support for holding said rack-bar in engagement, of a support for holding said rack-bar out of engagement, and a switch controlling the travel of said rack-bar on said supports, substantially as set forth.

33. The combination with the rack-pinion, the rack-bar, the rack-bar arm on which said rack-bar is mounted and means for operating said rack-bar arm, of a plate, a track-rail on said plate, a short rail on said plate substantially parallel with said track-rail, a switch-rail having an inclined end portion pivoted on said plate at the end of said short rail, an arm connected with said rack-bar arm and provided with a pin traveling on said track-rail and supporting said rack-bar arm thereon, and a switch-bar for switching said switch-rail and causing said supporting-arm at certain times to travel from said track-rail up onto said switch-rail and short rail to carry said rack-bar into engagement with said rack-pinion, said switch-bar acting in unison with said rack-bar arm, substantially as set forth.

34. The combination with the spool-carriage mounted on ways on the press-frame and adapted to travel on said ways, the spools mounted on said carriage, rocking arms mounted on a rocking shaft having its bearing on the press-frame, connecting-rods connecting said carriage with said rocking arms, and a crank-arm on said rocking shaft, of the needles, a rocking shaft on which said needles are mounted, a rocking arm on said shaft a connecting-rod connecting said crank-arm with said rocking arm on the needle-shaft, and means for rocking said needle-shaft to elevate and depress the needles and shift said spool-carriage on its ways, substantially as set forth.

35. The combination with the wire-twisters, and means for operating the twisters, a rock-shaft on which said needles are mounted, and means for rocking said shaft to raise the needles and depress the needles, of a spool-carriage mounted on ways on the press-frame and adapted to travel on said ways, the spool mounted on said carriage for carrying the upper baling-wires, guide-pulleys for guiding said wires into the twisters, rocking arms on which said pulleys are mounted, a rock-shaft on which said arms are mounted, connecting-rods connecting said rocking arms and the spool-carriage, a crank-arm on said rock-shaft, a rocking arm on the needle-shaft, and a connecting-rod connecting said crank-arm with the rocking arm on the needle-shaft, so that as the needles are raised the spool-carriage will be shifted on its ways and the guide-pulleys carried over the twisters carrying the wires into the twisters, and as the needles are depressed the spool-carriage will be again shifted and the pulleys carried from over the twisters and the wires released therefrom, substantially as set forth.

BENJAMIN FRANKLIN MARTINDALE.
FRANKLIN DAVIS MOORE.

Witnesses:
CHAN. B. CAMPBELL,
OLIVE B. OTHICK.